US012210939B2

(12) United States Patent
Bhide et al.

(10) Patent No.: US 12,210,939 B2
(45) Date of Patent: Jan. 28, 2025

(54) EXPLAINING MACHINE LEARNING BASED TIME SERIES MODELS

(71) Applicant: INTERNATIONAL BUSINESS MACHINES CORPORATION, Armonk, NY (US)

(72) Inventors: Manish Anand Bhide, Hyderabad (IN); Venkata R Madugundu, Hyderabad (IN); Pratap Kishore Varma Vemulamanda, Hyderabad (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1096 days.

(21) Appl. No.: 17/084,955

(22) Filed: Oct. 30, 2020

(65) Prior Publication Data
US 2022/0138614 A1 May 5, 2022

(51) Int. Cl.
G06N 20/00 (2019.01)
G06F 16/22 (2019.01)

(52) U.S. Cl.
CPC ......... *G06N 20/00* (2019.01); *G06F 16/2228* (2019.01)

(58) Field of Classification Search
None
See application file for complete search history.

(56) References Cited

U.S. PATENT DOCUMENTS

| 7,039,559 | B2 | 5/2006 | Froehlich | |
| 8,560,092 | B2* | 10/2013 | Zheng | G05B 13/048 700/28 |
| 11,645,307 | B1* | 5/2023 | Giannasi | G16H 50/20 707/738 |
| 2018/0259921 | A1* | 9/2018 | Luan | G06N 20/00 |
| 2019/0303719 | A1* | 10/2019 | Hamilton | G06F 16/906 |

(Continued)

OTHER PUBLICATIONS

Assaf, et al., "Explainable Deep Neural Networks for Multivariate Time Series Predictions," IBM Research, Zurich, Proceedings of the Twenty-Eighth International Joint Conference on Artificial Intelligence (IJCAI-19), Aug. 1, 2019, pp. 6488-6490.

(Continued)

*Primary Examiner* — Xuyang Xia
(74) *Attorney, Agent, or Firm* — Amin, Turocy & Watson, LLP

(57) ABSTRACT

A method, computer system, and computer program product for explaining time series machine learning model are provided. The embodiment may include determining a first order difference in time series input data and historical training data. The embodiment may also include performing perturbation of time series input data based on the determined first order difference and the determined historical training data. The embodiment may further include computing closeness of the determined first order difference in the historical training data to the determined first order difference in the time series input data. The embodiment may also include generating a uniform random sample of first value input to a time series machine learning model. The embodiment may further include determining values of other inputs to the time series machine learning model based on the generated random sample and a random sample from the historical training data first order differences.

17 Claims, 5 Drawing Sheets

(56) References Cited

U.S. PATENT DOCUMENTS

2021/0166151 A1* 6/2021 Kennel ................. G06N 20/00
2022/0129791 A1* 4/2022 Nia ..................... G06F 18/2414

OTHER PUBLICATIONS

Jain, "A Comprehensive Beginner's Guide to Create a Time Series Forecast (with Codes in Python and R)," Complete Guide to Time Series Forecasting (with Codes in Python), Jun. 26, 2020, Analytics Vidhya, https://www.analyticsvidhya.com/blog/2016/02/time-series-forecasting-codes-python/, Feb. 6, 2016, pp. 1-61.

Joseph, "Interpretability Part 3: Opening the Black Box With LIME and SHAP," Jun. 26, 2020, KDnuggets News, https://www.kdnuggets.com/2019/12/interpretability-part-3-lime-shap.html, Dec. 2019, pp. 1-18.

Mell, et al., "The NIST Definition of Cloud Computing," Recommendations of the National Institute of Standards and Technology, U.S. Department of Commerce, Special Publication 800-145, Sep. 2011, 7 pages.

Schockaert, et al., "Attention Mechanism for Multivariate Time Series Recurrent Model Interpretability Applied to the Ironmaking Industry," Researchgate.net, https://www.researchgate.net/publication/341579566, May 22, 2020, 5 pages.

Usai, "Time Series Machine Learning Analysis and Demand Forecasting with H2O & TSstudio," Dec. 11, 2019, #Machine Learning #Time Series, Time Series Machine Learning Analysis and Demand Forecasting with H2O & TSstudio, Jun. 26, 2020, https://diegousai.io/2019/12/time-series-machine-learning-analysis-and-demand-forecasting/, pp. 1-42.

\* cited by examiner

EXPLAINING MACHINE LEARNING BASED TIME SERIES MODELS

BACKGROUND

The present invention relates, generally, to the field of computing, and more particularly to time series prediction model.

Time series is a series of data points indexed in time order. Time series has a lot of use in real life. For example, time series can be used in predicting the future demand for a product, predicting the future stock price, etc. Typically, there are various techniques such as Autoregressive Integrated Moving Average (ARIMA), Autoregression (AR), Moving Average (MA), Autoregressive Moving Average (ARMA), Holt-Winters that can forecast on time series data.

SUMMARY

According to one embodiment, a method, computer system, and computer program product for explaining time series machine learning model are provided. The embodiment may include determining a first order difference in time series input data and historical training data. The embodiment may also include performing perturbation of time series input data based on the determined first order difference and the determined historical training data. The embodiment may further include computing closeness of the determined first order difference in the historical training data to the determined first order difference in the time series input data. The embodiment may also include generating a uniform random sample of first value input to a time series machine learning model. The embodiment may further include determining values of other inputs to the time series machine learning model based on the generated random sample and a random sample from the historical training data first order differences.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
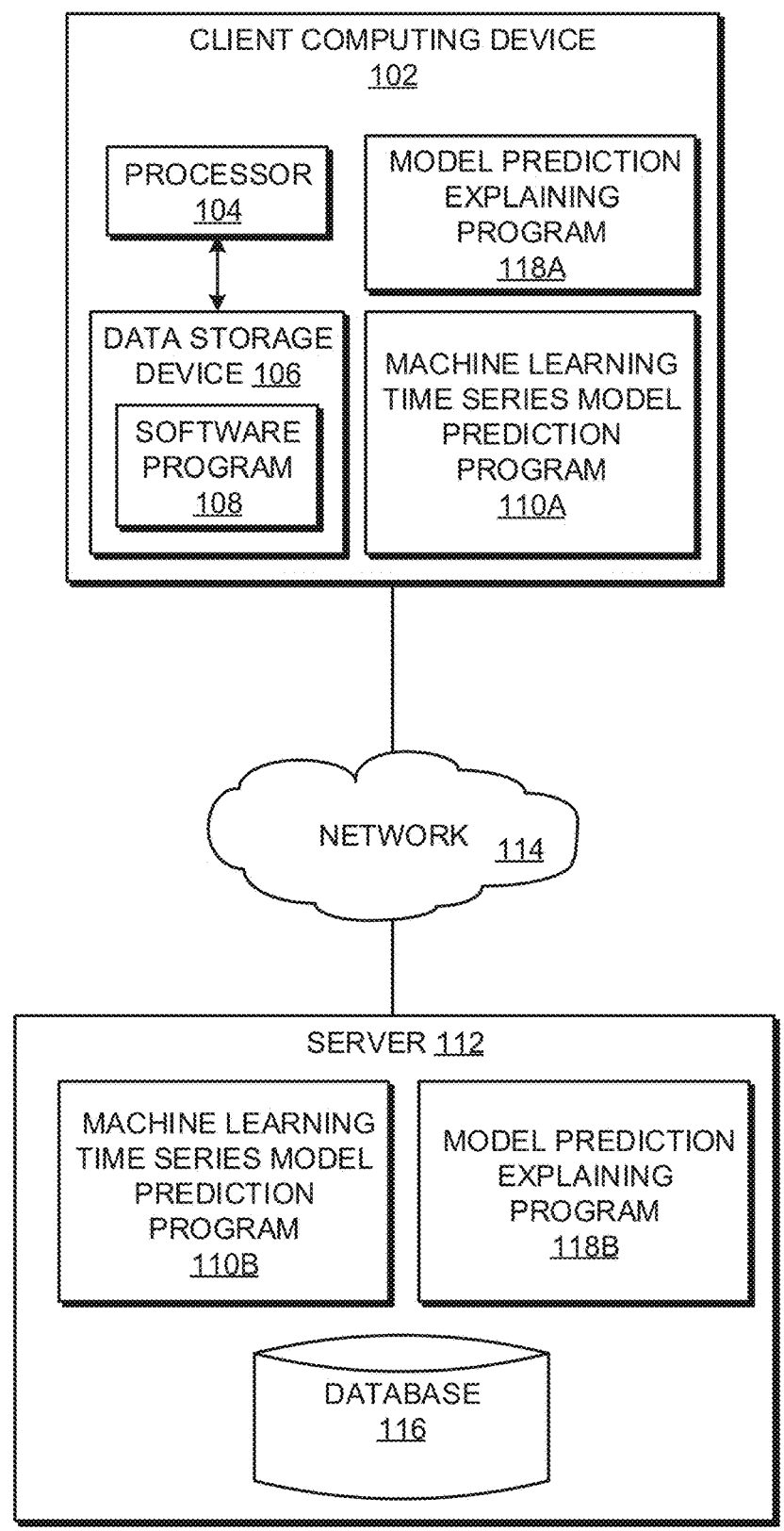
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to time series prediction. The following described exemplary embodiments provide a system, method, and program product to explain time series model prediction where the model is a regular machine learning model, not a statistical model such as ARIMA, AR, MA, etc. Therefore, the present embodiment has the capacity to improve the technical field of time series prediction systems by using a machine learning technique that can analyze and explain the prediction of the data which is not or is not assumed to be Independent and Identically Distributed (the IID principal). This may be helpful in providing insights or factors of how the time series prediction systems made the prediction.

As previously described, time series is a series of data points indexed in time order. Time series has a lot of use in real life. For examples, time series can be used in predicting the future demand for a product, predicting the future stock price, etc. Typically, there are various techniques such as ARIMA, AR, MA, ARMA, Holt-Winters that can forecast on time series data. One aspect of time series data is noisiness and it is often difficult to fit any of the standard models on such data, although each of the above techniques have a standard way to explain and understand a future prediction.

A machine learning based time series model may accept a set of historical values and use those values to predict the value of the time series in the future. For example, the model may accept the value for the last five-time steps, and it predicts the value for future time step. The model may accept values V1, V2, V3, V4 and V5 and it may predict the value V6. Such a model is regarded as a univariate single step model. If the model were to predict multiple values in the future such as V6, V7 and V8, then the model may be regarded as a univariate multi-step. One of the best-known techniques for explaining a model prediction is Local Interpretable Model-agnostic Explanations (LIME). LIME may be used to explain why a prediction was made or which variables caused the prediction. This technique requires the input data to be perturbed to find data points in the vicinity of the data points for which a user tries to generate an explanation. These perturbed data points are then sent back to the model to understand the model prediction, and then LIME fits a sparse linear model on the perturbed data points to understand the features which play a major role in the model prediction.

However, one of the biggest challenges with using LIME for generating an explanation for time series machine learning models is that all the features are independent and identically distributed ("IID principal"). That is, no relationship can be found between one or more different feature values. Since there is a definite relationship between one or more feature values in case of time series, the IID principal does not apply to the case of time series data. For example, each feature of the time series machine learning model cannot be perturbed independently. If a user change feature V1 from 9 to 12, the user cannot change feature v2 from 10 to 5. When V1 changes, the value of V2 will also change in a fixed manner. One way to find a relationship between the values is to fit a time series model such as ARMA, ARIMA, etc., on the data. If the times series models are fit using such statistical model, the values for V2, V3, V4 and V5 may be predicted. However, the reason a regular machine learning model need to be used is that it may be difficult to fit the statistical models on the data. Therefore, there is clearly a need to enable LIME to work for data which is not independent and identically distributed, thereby assisting a user in generating an explanation for time series machine learning models.

According to one embodiment, the present invention may integrate with LIME to explain time series model prediction by employing a new approach for perturbation of data. The present invention may find the perturbation of the input data by finding the first order difference in the input as well as historical training data. In at least one other embodiment, the present invention may also find the top-n historical first order differences which are close to the first order difference present in the input and generate a uniform random sample of the first value input to the model and determine the other values of input by randomly selecting m historical differences from the top-n saved.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for explaining time series model prediction where the model is a regular machine learning model and not a statistical model.

Referring to FIG. 1, an exemplary networked computer environment 100 is depicted according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108, a model prediction explaining program 118A and a machine learning time series model prediction program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a model prediction explaining program 118B a machine learning time series model prediction program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the machine learning time series model prediction program 110A, 110B may be a program capable of predicting the value of input at time g given the input at previous time steps. In one embodiment, the model prediction explaining program 118A, 118B may be a program capable of interacting with the machine learning time series model prediction program 110A, 110B to generate an explanation of the model prediction that the machine learning time series prediction program 110A, 110B generates. The machine learning time series model prediction explanation process is explained in further detail below with respect to FIG. 2.

Figure 2:
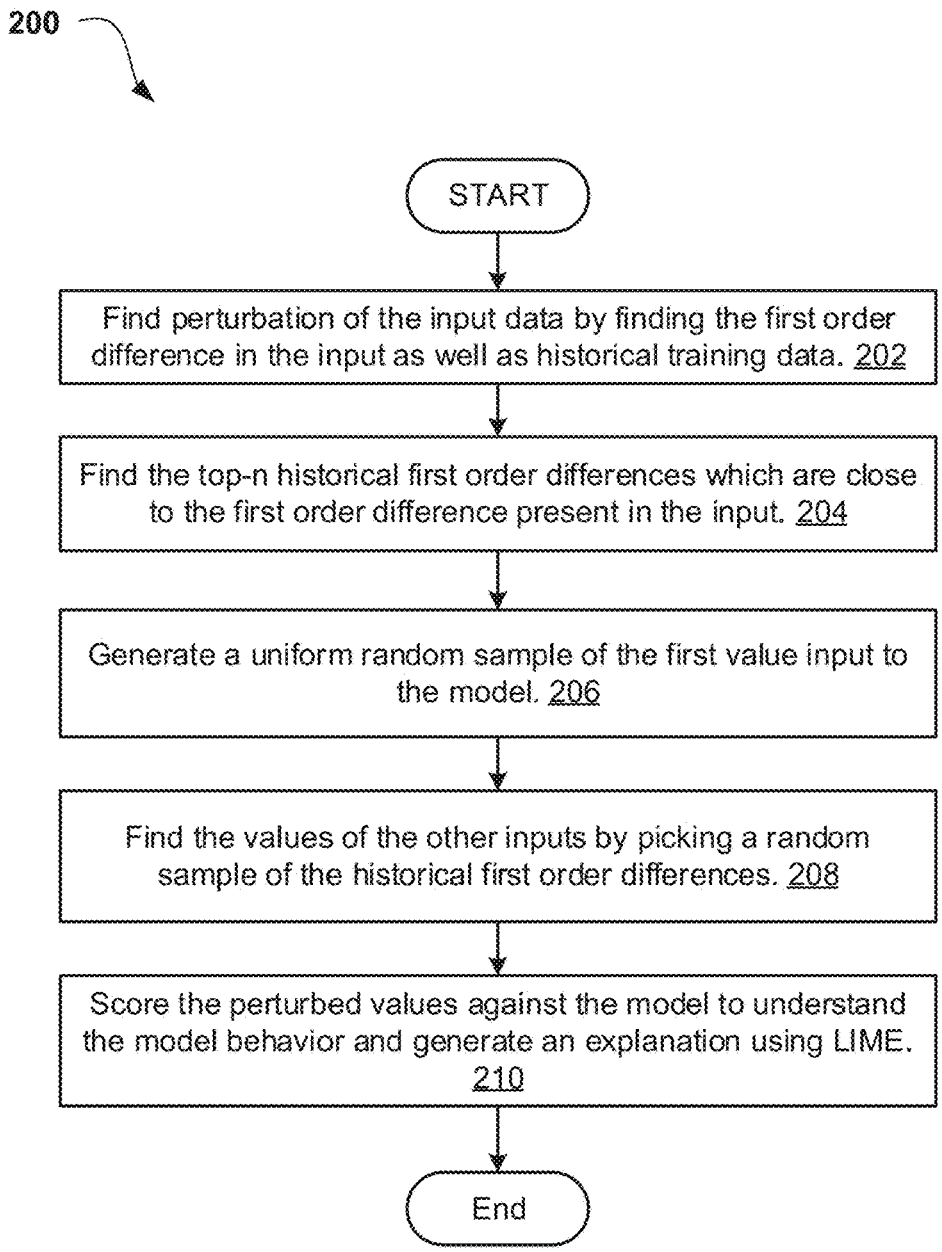
FIG. 2 is an operational flowchart illustrating a machine learning based time series prediction explanation process according to at least one embodiment.

Referring to FIG. 2, an operational flowchart illustrating a machine learning time series model prediction explanation process 200 is depicted according to at least one embodiment. At 202, the machine learning time series model prediction explaining program 118A, 118B finds perturbation of the input data by finding the first order difference in the input as well as historical training data. The first difference of a time series is the series of changes from one period to the next. For example, if $Y_t$ denotes the value of the time series Y at period t, then the first difference of Y at period t is equal to $Y_t - Y_{t-1}$. The machine learning time series model prediction explaining program 118A, 118B may first compute the first order difference of the time series training data and find correlation between consecutive time steps of the time series. For example, if the input to the model was the last N time steps, then the machine learning time series model prediction explaining program 118A, 118B may find the window of size N−1 of the first order difference from the training data. In at least one other embodiment, the machine learning time series model prediction explaining program 118A, 118B may store the information related to the above first order differences in a database for the future use.

In an embodiment, the machine learning time series model prediction explaining program 118A, 118B may find input first order difference. For example, if the machine learning time series model prediction program 110A, 110B accepts data values V1, V2, V3, V4 and V5 and predict the value for V6. The machine learning time series model prediction explaining program 118A, 118B may find the first order difference in the input values as D1, D2, D3 and D4, where D1=V2−V1, D2=V3−V2, D3=V4−V3 and D4=V5−V4. Thus, the machine learning time series model prediction explaining program 118A, 118B may have a window of input first order differences D1, D2, D3 and D4 of size 4, which number is N−1 and may also have historical first order difference window of size 4 which may be computed using the training data.

The machine learning time series model prediction explaining program 118A, 118B first may perturb the value of V1. Since the values of V2, V3, V4 and V5 may not directly be perturbed, the machine learning time series model prediction explaining program 118A, 118B may find some historical first order difference which may then be used to find the values of V2, V3, V4 and V5. For example, if the historical first order difference is: 2. −1, 2, 4, then the value of V2=V1+2, V3=V2−1, V4=V3+2 and V5=V4+4. In at least one other embodiment, the machine learning time series model prediction explaining program 118A, 118B may determine which historical first order difference to utilize based on a distance to the original data point first order difference. For example, the machine learning time series model prediction explaining program 118A, 118B may select data values close to the original data point and perturb the values. In another embodiment, the machine learning time series model prediction explaining program 118A, 118B may find historical first order difference values which are close to the first order difference present in the input. The machine learning time series model prediction explaining program 118A, 118B may measure the distance between the two first order differences using Root Mean Square Error (RMSE) as the metrics. the machine learning time series model prediction explaining program 118A, 118B may handle negative and positive metric values using SMSE to compute the closeness of two first order difference. In an embodiment, the machine learning time series model prediction explaining program 118A, 118B may store duplicate first order difference values in a database as those first order differences that occur with high frequency need to be recorded as a high priority first order difference for later use.

Next at 204, the machine learning time series model prediction explaining program 118A, 118B may find the top n historical first order differences which are close to the first order difference present in the input. In one embodiment, the machine learning time series model prediction explaining program 118A, 118B may find the top n metrics which are closest to the current input.

At 206, the machine learning time series model prediction explaining program 118A, 118B generates a uniform random sample of the first value input to the model. In one embodiment, the machine learning time series model prediction explaining program 118A, 118B may pick up a random value for V1 in close vicinity of the original value. In another embodiment, the machine learning time series model prediction explaining program 118A, 118B may pick up random m values from this historical first order differences that were stored in the earlier step.

At 208, the machine learning time series model prediction explaining program 118A, 118B finds the values of the other inputs by picking a random sample of the historical first order differences. In one embodiment, for each of the first order difference value selected, the machine learning time series model prediction explaining program 118A, 118B may find the value for V2, V3, V4 and v5 by using the values of the differences. For example, if the values of the selected first order difference are D1, D2, D3 and D4, then the value may be V2=V1+D1, V3=V2+D2, V4=V3+D4 and V5=V4+D4.

At 210, the model prediction explaining program 118A, 118B score the perturbed values against the model to understand the model behavior and generate an explanation using LIME. In one embodiment, the machine learning time series model prediction explaining program 118A, 118B may interact with the model prediction program 110A, 110B and provide the prediction values that were perturbed in the previous steps. In another embodiment, the model prediction explaining program 118A, 118B uses LIME to fit a sparse linear model on the perturbed data points to understand the features which play a major role in the model prediction.

It may be appreciated that FIG. 2 provides only an illustration of one implementation and does not imply any limitations with regard to how different embodiments may be implemented. Many modifications to the depicted environments may be made based on design and implementation requirements. For example, in at least one embodiment, the machine learning time series model prediction program 110A, 110B may generate a future prediction of the time series data using other machine learning techniques, such as neural nets and deep learning and ensemble methods, etc.

Figure 3:
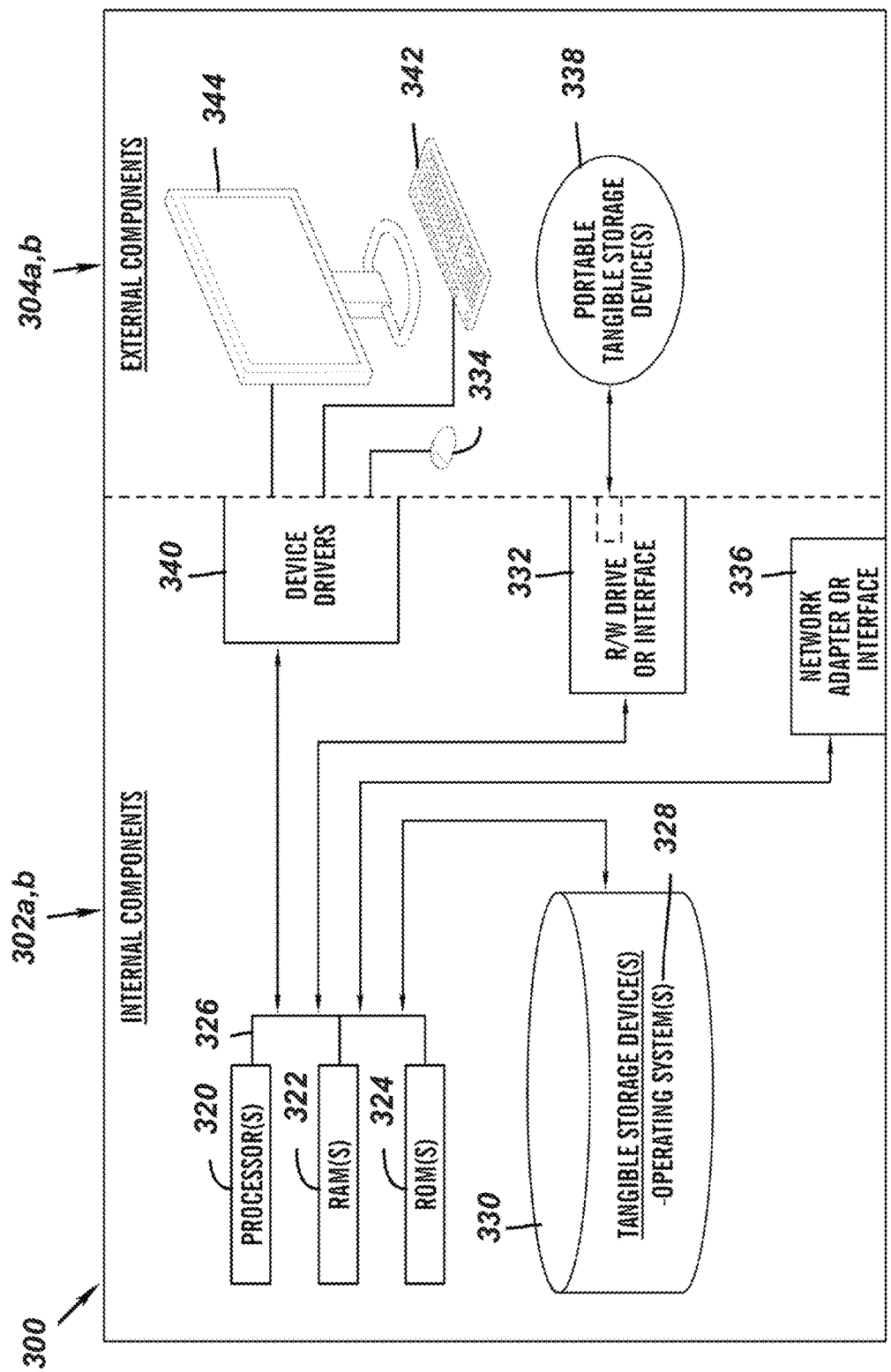
FIG. 3 is a block diagram of internal and external components of computers and servers depicted in FIG. 1 according to at least one embodiment.

FIG. 3 is a block diagram of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smartphone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108, the model prediction explaining program 118A and the machine learning time series model prediction program 110A in the client computing device 102 and the model prediction explaining program 118B and the machine learning time series model prediction program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 *a,b* also includes an R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the online collaboration checkpoint program 110A, 110B can be stored on one or more of the respective portable computer-readable tangible storage devices 338, read via the respective R/W drive or interface 332 and loaded into the respective hard drive 330.

Each set of internal components 302 *a,b* also includes network adapters or interfaces 336 such as a TCP/IP adapter cards, wireless Wi-Fi interface cards, or 3G or 4G wireless interface cards or other wired or wireless communication links. The software program 108, the model prediction explaining program 118A and the machine learning time series model prediction program 110A in the client computing device 102 and the model prediction explaining program 118B and the machine learning time series model prediction program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the model prediction explaining program 118A and the machine learning time series model prediction program 110A in the client computing device 102 and the model prediction explaining program 118B and the machine learning time series model prediction program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 4:
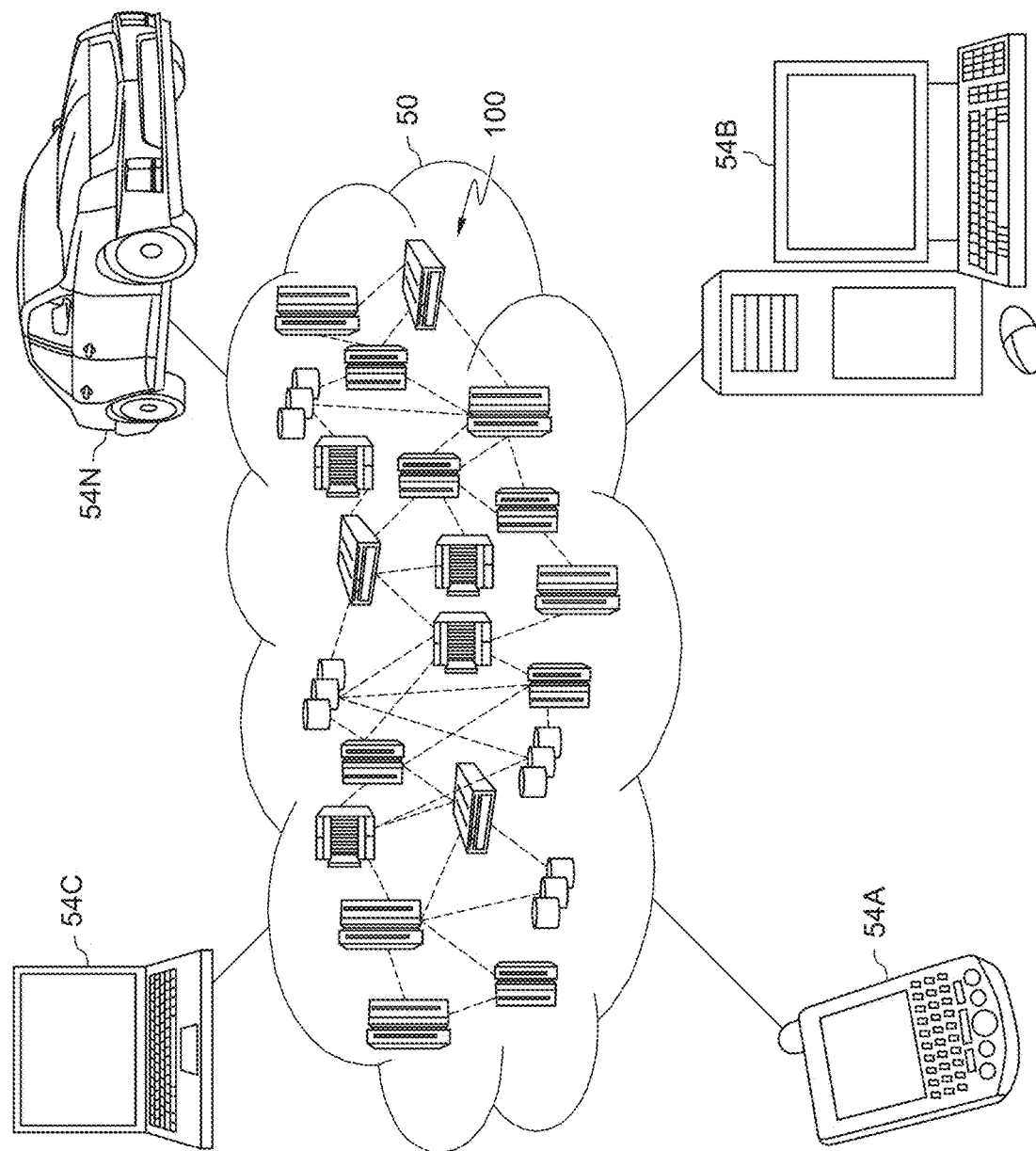
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 5:
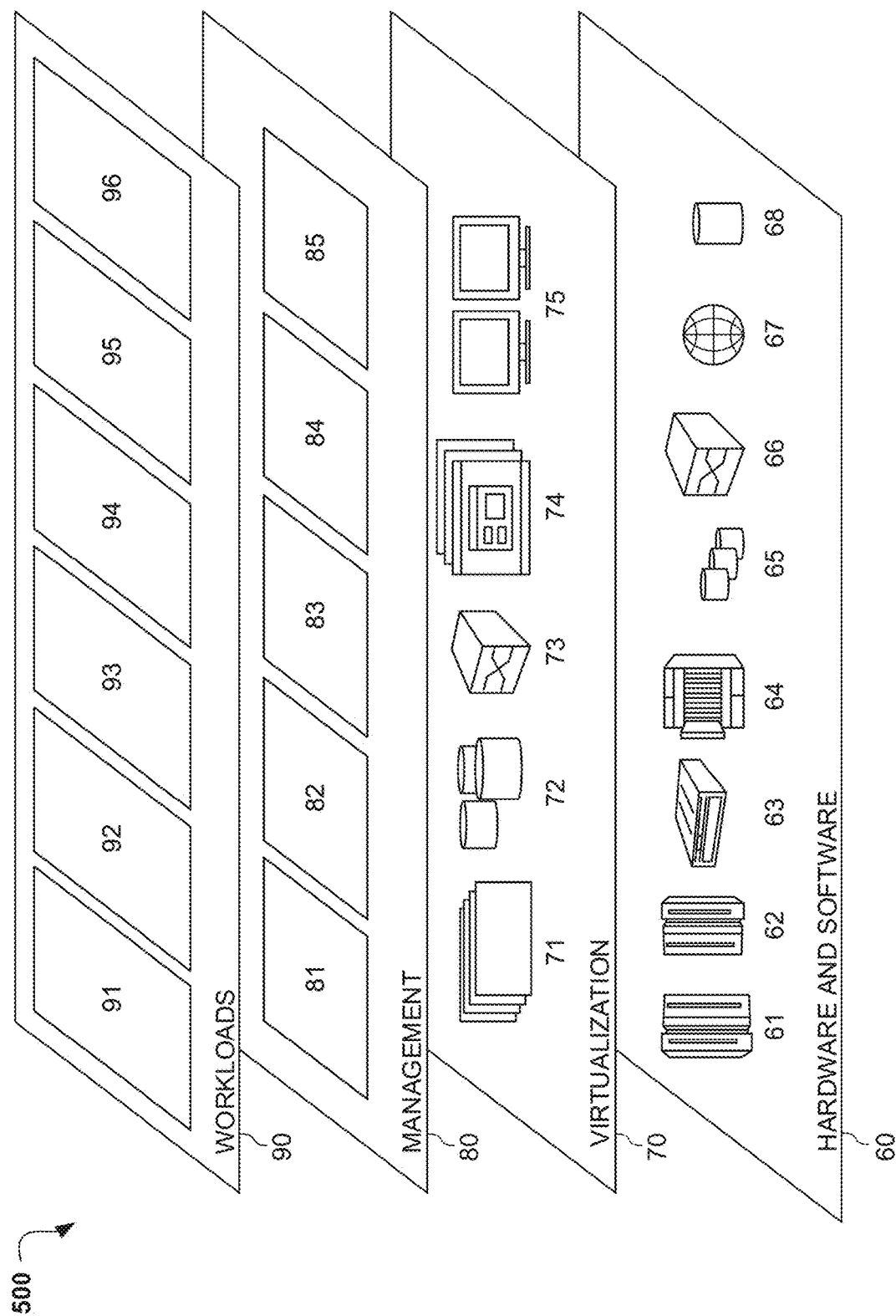
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning time series model prediction explanation 96. Machine learning time series model prediction explanation 96 may relate to computing perturbed values to generate explanation to understand time series model behavior.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method of a machine learning time series model prediction explanation process, the method comprising:
   determining, by a system operatively coupled to a processor, a first order difference in time series input data, wherein the time series input data is not independent and identically distributed (IID);
   determining, by the system, a first order difference in historical training data;
   determining, by the system, closest ones of the determined first order difference in the historical training data to the determined first order difference in the time series input data;
   generating, by the system, time series input data for perturbation based on steps comprising generating:
      a uniform random sample of a plurality of the closest ones of the determined first order difference in the time series input data; and
      a random sample of a plurality of the closest ones of the determined first order difference of the historical training data;
   performing, by the system, perturbations of the generated time series input data;
   predicting, by the system, values of other time series input data based on the perturbations of the generated time series input data; and
   scoring, by the system, the perturbations of the generated time series input data against a model to generate an explanation, using a Local Interpretable Model-agnostic Explanations (LIME), of features that play a role in the prediction by the model,
   and wherein one or more duplicates in values in the determined first order difference in the historical training data are not removed to ensure that the values in the determined first order difference in the historical training data are of high frequency and are used again when selecting m random determined first order differences.

2. The method of claim 1, wherein the determining the closest ones comprises determining the top n closest ones of the determined first order difference in the historical training data to the determined first order difference in the time series input data.

3. The method of claim 1, further comprising:
   selecting, by the system, from the random sample, m random first order differences from the determined closest ones of the top n determined first order difference in the historical training data.

4. The method of claim 2, further comprising:
   computing, by the system, a distance between the determined first order difference in the historical training data and the determined first order difference in the time series input data.

5. The method of claim 4, further comprising:
   computing, by the system, the distance using a root mean square error technique.

6. The method of claim 1, wherein the scoring is utilized to generate a prediction and fit results and wherein LIME fits a sparse linear model on the perturbations to understand the features that play a role in the prediction by the model.

7. A computer system of a machine learning time series model prediction explanation process, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
determining a first order difference in time series input data, wherein the time series input data is not independent and identically distributed (IID);
determining a first order difference in historical training data;
determining closest ones of the determined first order difference in the historical training data to the determined first order difference in the time series input data;
generating time series input data for perturbation based on steps comprising generating:
a uniform random sample of a plurality of the closest ones of the determined first order difference in the time series input data; and
a random sample of a plurality of the closest ones of the determined first order difference of the historical training data;
performing perturbations of the generated time series input data;
predicting, by the system, values of other time series input data based on the perturbations of the generated time series input data; and
scoring, by the system, the perturbations of the generated time series input data against a model to generate an explanation, using a Local Interpretable Model-agnostic Explanations (LIME), of features that play a role in the prediction by the model,
and wherein one or more duplicates in values in the determined first order difference in the historical training data are not removed to ensure that the values in the determined first order difference in the historical training data are of high frequency and are used again when selecting m random determined first order differences.

8. The computer system of claim 7, wherein the determining the closest ones comprises determining the top n closest ones of the determined first order difference in the historical training data to the determined first order difference in the time series input data.

9. The computer system of claim 7, further comprising:
selecting, from the random sample, m random first order differences from the determined closest ones of the top n determined first order difference in the historical training data.

10. The computer system of claim 7, further comprising:
computing a distance between the determined first order difference in the historical training data and the determined first order difference in the time series input data.

11. The computer system of claim 10, further comprising:
computing the distance using a root mean square error technique.

12. The computer system of claim 7, wherein the scoring is utilized to generate a prediction and fit results and wherein LIME fits a sparse linear model on the perturbations to understand the features that play a role in the prediction by the model.

13. A computer program product for explaining time series machine learning model, the computer system comprising:
one or more computer-readable tangible storage media and program instructions stored on at least one of the one or more tangible storage media, the program instructions executable by a processor of a computer to perform a method, the method comprising:
determining a first order difference in time series input data, wherein the time series input data is not independent and identically distributed (IID);
determining a first order difference in historical training data;
determining closest ones of the determined first order difference in the historical training data to the determined first order difference in the time series input data;
generating time series input data for perturbation based on steps comprising generating:
a uniform random sample of a plurality of the closest ones of the determined first order difference in the time series input data; and
a random sample of a plurality of the closest ones of the determined first order difference of the historical training data;
performing perturbations of the generated time series input data;
predicting, by the system, values of other time series input data based on the perturbations of the generated time series input data; and
scoring, by the system, the perturbations of the generated time series input data against a model to generate an explanation, using a Local Interpretable Model-agnostic Explanations (LIME), of features that play a role in the prediction by the model,
and wherein one or more duplicates in values in the determined first order difference in the historical training data are not removed to ensure that the values in the determined first order difference in the historical training data are of high frequency and are used again when selecting m random determined first order differences.

14. The computer program product of claim 13, wherein the determining the closest ones comprises determining the top n closest ones of the determined first order difference in the historical training data to the determined first order difference in the time series input data.

15. The computer program product of claim 13, further comprising:
selecting, by the system, from the random sample, m random first order differences from the determined closest ones of the top n determined first order difference in the historical training data.

16. The computer program product of claim 13, further comprising:
computing a distance between the determined first order difference in the historical training data and the determined first order difference in the time series input data.

17. The computer program product of claim 13, wherein the scoring is utilized to generate a prediction and fit results and wherein LIME fits a sparse linear model on the perturbations to understand the features that play a role in the prediction by the model.

* * * * *